United States Patent Office 2,716,659
Patented Aug. 30, 1955

2,716,659
ARYLURETHANS OF HEXYLRESORCINOL

Frank J. Kreysa, Richmond Hill, and Peter Claude Hereld, East Meadow, N. Y., assignors to Chemo Puro Manufacturing Corporation, Long Island City, N. Y., a corporation of New York No Drawing. Application October 2, 1952, Serial No. 312,864

6 Claims. (Cl. 260—471)

The present invention relates to new and useful chemical compounds comprising certain arylurethans of hexylresorcinol and more particularly to the hereinafter-defined phenyl and naphthyl carbamates of hexyl-recorcinol.

The new arylurethans of hexylresorcinol were prepared by reacting hexylresorcinol with the appropriate aryl isocyanate or aryl carbamyl chloride in the presence of pyridine or carbon tetrachloride in a manner similar to the method described in Shriner and Fuson (Identification of Organic Compounds, John Wiley & Sons, Inc., 3d ed., 1948, page 163). The new compounds were micro-analyzed in accordance with the technique outlined by Niederl and Niederl (Micromethods of Quantitative Organic Analysis, John Wiley & Sons, Inc., 2d ed., 1948).

The invention is illustrated by, but not limited to, the following examples:

EXAMPLE I
*1-n-hexylresorcinol-2,4-N-phenyl carbamate*

This compound was prepared according to the method described in the Shriner and Fuson publication specified above. Ten grams (0.052 mol) of hexylresorcinol were dissolved in 13 grams (0.109 mol) of phenyl iso-cyanate. Two drops of pyridine were added to the mixture, and it was then warmed over a steam bath. The reaction mixture was protected with a CaCl₂ tube against moisture.

A homogeneous solution resulted from which crystals began to appear after 10 to 12 minutes. Heating was discontinued, and within a few minutes the entire mass had solidified. The solid was taken up with carbon tetrachloride and the resulting mixture heated and filtered. In this manner any diphenyl urea formed was removed.

The filtrate was cooled and the resulting crystals filtered out. The yield was approximately 56% and the melting point was 151–152° C.

This reaction will proceed in a similar manner without the pyridine catalyst but the mixture must be warmed for several hours before the product is obtained. This is in consonance with the findings of Tarbell and coworkers (J. A. C. S. 64 (1942) p. 2229).

Analysis for $C_{26}H_{28}O_4N_2$:

|  | Calculated | Observed |
|---|---|---|
|  | Percent | Percent |
| Carbon | 72.19 | 71.92 |
| Hydrogen | 6.54 | 6.42 |
| Nitrogen | 6.48 | 6.5 |

The reaction is as follows:

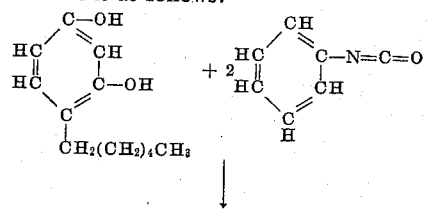

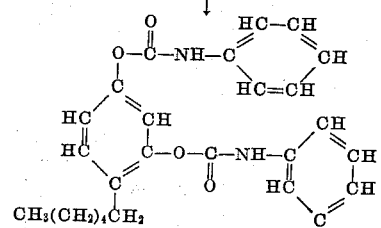

EXAMPLE II
*1-n-hexylresorcinol-2,4-N-1-naphthyl carbamate*

This compound was prepared in a manner similar to that of Example I. 7 grams (0.038 mol) of hexyl-resorcinol were dissolved in 15 grams (0.088 mol) of α-naphthyl iso-cyanate and 2 drops of pyridine were added.

The mixture was heated on a steam bath for 30 to 35 minutes before crystals began to appear. On cooling, the product solidified. It was taken up with carbon tetrachloride, warmed, and filtered. After cooling, the derivative precipitated and was removed by filtration. The yield was 53% and the melting point 201–202° C.

Analysis for $C_{34}H_{32}O_4N_2$:

|  | Calculated | Observed |
|---|---|---|
| Carbon percent | 76.66 | 76.85 |
| Hydrogen do | 6.07 | 6.28 |
| Nitrogen do | 5.26 | 5.2 |
| Molecular Weight | 532.68 | 496 |

The reaction is as follows:

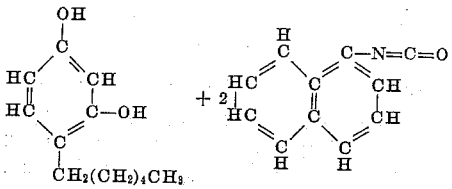

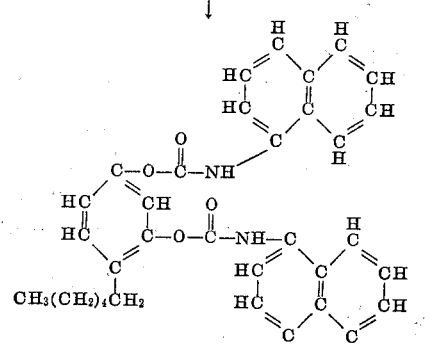

EXAMPLE III
*1-n-hexylresorcinol-2,4-N-2-naphthyl carbamate*

In preparing this compound, hexylresorcinol was reacted with β-napthyl iso-cyanate. Fifteen grams of technical β-naphthyl iso-cyanate were heated in 250 cc. of dry benzene and the mixture filtered. The residue from this step weighed 4.0 grams, indicating that 0.065 mol was in solution. This residue was presumed to be the urea formed as a result of reaction with moisture in the air in the following manner:

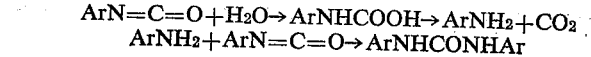

To the benzene solution, 5.8 grams (0.030 mol) of hexylresorcinol and 1 drop of pyridine were added; and the mixture heated under reflux for 2 hours. As refluxing continued, the solution became brown-orange in color.

The volume of the solution was reduced to approximately 150 cc. and cooled. Crystallization occurred readily and the derivative was removed by filtration. The yield was 34% and the melting point 151–152° C.

Analysis for $C_{34}H_{32}O_4N_2$:

|  | Calculated | Observed |
|---|---|---|
| Carbon_____percent__ | 76.66 | 76.40 |
| Hydrogen_____do____ | 6.07 | 6.12 |
| Nitrogen_____do____ | 5.26 | 5.5 |
| Molecular Weight_____ | 532.68 | 504 |

The reaction is as follows:

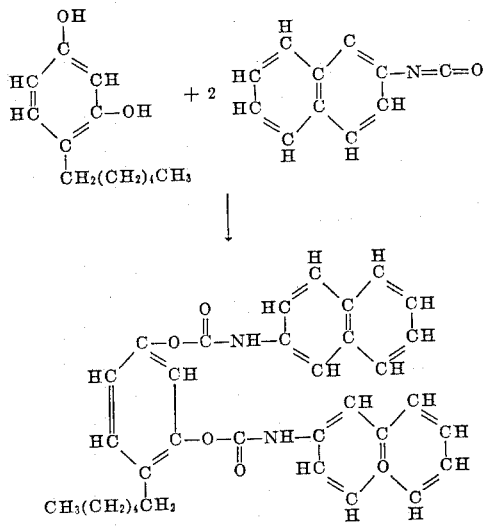

EXAMPLE IV

*1-n-hexylresorcinol-2,4-N-diphenyl carbamate*

Diphenylcarbamyl chloride forms esters with phenols in the presence of pyridine. Herzog (Ber. 40 (1909) p. 1831) has isolated an addition product, and proposed the following reactions:

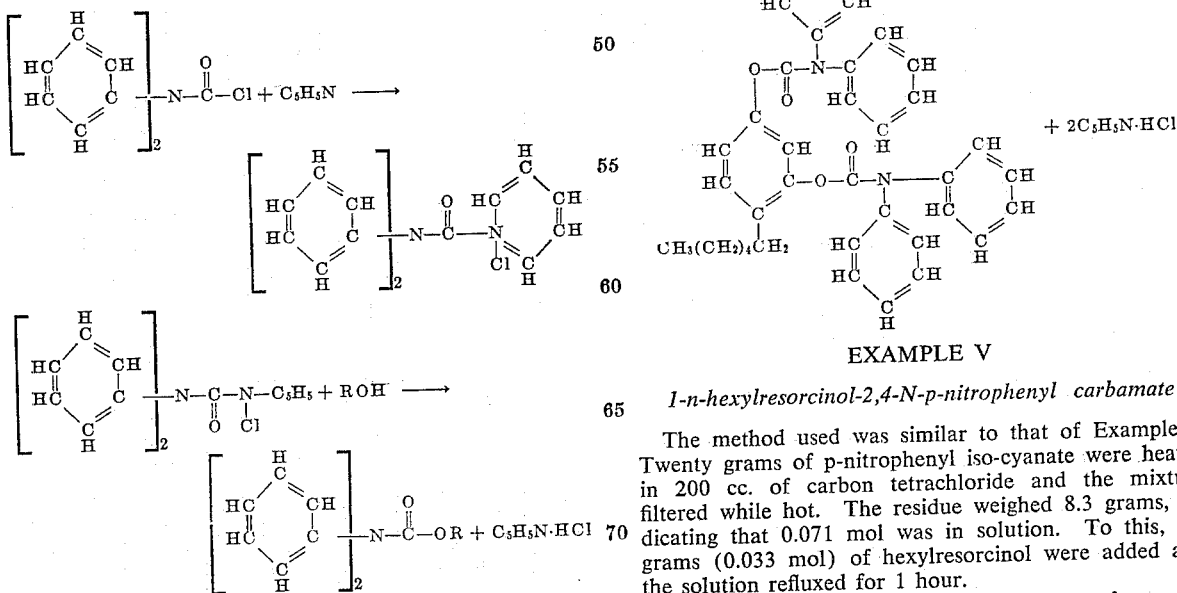

In this preparation, 5.0 grams (0.026 mol) of hexylresorcinol were refluxed for 3 hours with 12.0 grams (0.052 mol) of diphenylcarbamyl chloride and 4.1 grams (0.052 mol) of pyridine in 200 cc. of carbon tetrachloride (0.052 mol) of pyridine in 200 cc. of carbon tetrachloride. As the refluxing continued, the solution became amber in color. The volume of the solution was reduced to approximately 75 cc. and the solution cooled. Crystallization occurred after standing overnight. The yield was 30% and the melting point 83–84.5° C.

Analysis for $C_{38}H_{36}O_4N_2$:

|  | Calculated | Observed |
|---|---|---|
| Carbon_____percent__ | 78.04 | 78.08 |
| Hydrogen_____do____ | 6.22 | 5.97 |
| Nitrogen_____do____ | 4.79 | 4.93 |
| Molecular Weight_____ | 584.76 | 610 |

The reactions are as follows:

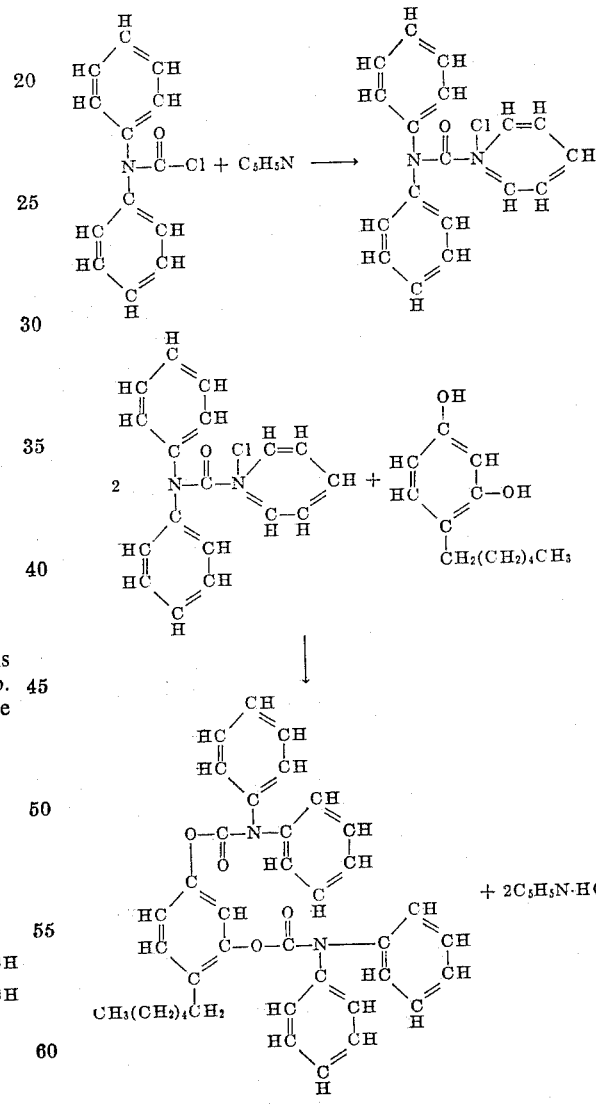

EXAMPLE V

*1-n-hexylresorcinol-2,4-N-p-nitrophenyl carbamate*

The method used was similar to that of Example I. Twenty grams of p-nitrophenyl iso-cyanate were heated in 200 cc. of carbon tetrachloride and the mixture filtered while hot. The residue weighed 8.3 grams, indicating that 0.071 mol was in solution. To this, 6.4 grams (0.033 mol) of hexylresorcinol were added and the solution refluxed for 1 hour.

The solution was evaporated to a volume of approximately 50 cc., cooled, and the resulting precipitate removed by filtration. The residue was warmed in 150 cc. of carbon tetrachloride and filtered while hot. The volume of the filtrate was reduced to 100 cc., and the filtrate was allowed to stand overnight, during which time crystallization occurred. The yield was 43% and the melting point 122–123° C.

Analysis for $C_{26}H_{26}O_6N_4$:

|  | Calculated | Observed |
|---|---|---|
| Carbon_____percent__ | 59.76 | 59.63 |
| Hydrogen_____do____ | 5.02 | 5.20 |
| Molecular Weight_____ | 522.56 | 478 |

The reaction is as follows:

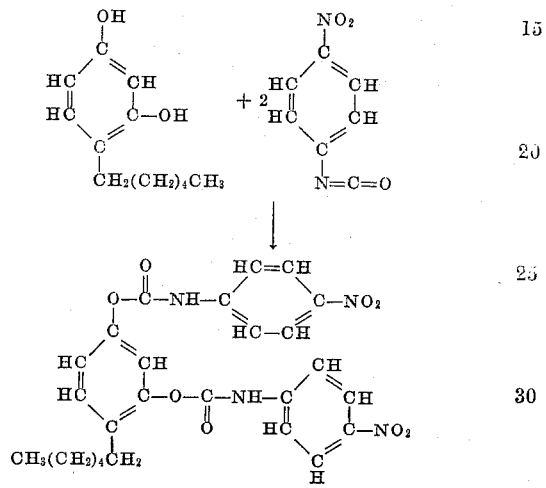

Our new compounds therefore respond to the general formula:

Hexylresorcinol-2,4-N-aryl carbamate, wherein aryl stands for one or more substituted or unsubstituted mono, or dicarbocyclic aryl groups such as phenyl, diphenyl, naphthyl and nitro-phenyl groups and wherein the hexylresorcinol moiety is 1-n-hexylresorcinol.

The new compounds are effective as anthelmintics free from escharotic effect.

We claim:

1. An aryl carbamate of hexylresorcinol selected from the group consisting of (a) 1-n-hexylresorcinol-2,4-N-phenyl carbamate, (b) 1-n-hexylresorcinol-2,4-N-1-naphthyl carbamate, (c) 1-n-hexylresorcinol-2,4-N-2-naphthyl carbamate, (d) 1-n-hexylresorcinol-2,4-N-diphenyl carbamate, (e) 1-n-hexylresorcinol-2,4-N-p-nitrophenyl carbamate.
2. 1-n-hexylresorcinol-2,4-N-phenyl carbamate.
3. 1-n-hexylresorcinol-2,4-N-1-naphthyl carbamate.
4. 1-n-hexylresorcinol-2,4-N-2-naphthyl carbamate.
5. 1-n-hexylresorcinol-2,4-N-diphenyl carbamate.
6. 1-n-hexylresorcinol-2,4-N-p-nitrophenyl carbamate.

References Cited in the file of this patent
Tomita et al., J. Pharm. Soc. Japan 71 73–7 (1951).
Lyons et al., J. Chem. Soc., 1950, 1971–2.